United States Patent [19]
Kejha

[11] Patent Number: 5,811,959
[45] Date of Patent: Sep. 22, 1998

[54] SMART CIRCUIT BOARD FOR MULTICELL BATTERY PROTECTION

[76] Inventor: Joseph B. Kejha, 1022 Federick Rd., Meadowbrook, Pa. 19046

[21] Appl. No.: 775,033

[22] Filed: Dec. 27, 1996

[51] Int. Cl.[6] .................................................. H07H 10/44
[52] U.S. Cl. ........................................... 320/126; 320/137
[58] Field of Search ................................. 320/5, 6, 7, 15, 320/16, 17, 18, 35, 120, 126, 137, 134

[56] References Cited

U.S. PATENT DOCUMENTS

| | | | |
|---|---|---|---|
| 4,238,721 | 12/1980 | DeLuca et al. | 320/18 |
| 4,297,629 | 10/1981 | Godard et al. | 320/7 |
| 4,616,170 | 10/1986 | Urstöger | 320/5 |
| 5,387,857 | 2/1995 | Honda et al. | 320/18 |
| 5,488,282 | 1/1996 | Hayden et al. | 320/17 X |
| 5,504,415 | 4/1996 | Podrazhansky et al. | 320/18 |
| 5,557,189 | 9/1996 | Suzuki et al. | 320/18 |
| 5,656,915 | 8/1997 | Eaves | 320/6 |

OTHER PUBLICATIONS

A Brochure of Exar Corp., San Jose, CA., entitled "Lithium–Ion Cell Protection System", dated Oct. 1995.
A Brochure of Exar Corp., San Jose, CA., entitled "Interactive Battery Management System," dated Oct. 1995.

Primary Examiner—Peter S. Wong
Assistant Examiner—Gregory J. Toatley, Jr.

[57] ABSTRACT

An interface circuit device for safe and efficient charging and/or discharging of any multicelled battery or pack of batteries. The device includes circuitry for protection of said battery or pack of batteries from overcharge, overdischarge and overheating during charge or discharge. The cells of the multicelled battery or individual batteries of the battery pack are charged individually in parallel and discharged together in series through said device, while being individually sensed and individually disconnected by a protective circuitry. The device is preferably part of the product powered by the battery, not part of the battery.

34 Claims, 2 Drawing Sheets

SMART CIRCUIT BOARD FOR MULTICELL BATTERY PROTECTION

CROSS REFERENCE TO RELATED DOCUMENT

The subject matter of the invention is shown and described in the Disclosure Document of Joseph B. Kejha, Ser. No. 384,079 filed on Oct. 10, 1995.

BACKGROUND OF THE INVENTION

1. Field of Invention

The subject invention pertains to an interface circuit board for safe charging and discharging of any multicelled battery or pack of batteries and for the protection of said battery or battery pack or pack of batteries from overheating during charge or discharge, and for the protection of individual cells or packs of cells or batteries from overcharge or overdischarge.

The cells, or packs of cells, or individual batteries of a battery pack are charged individually in parallel and discharged in series, while being individually sensed and protected by a disconnecting circuitry.

The board is preferably part of a product which is powered by the multicelled battery, not part of the battery.

2. Description of the Prior Art

Prior art circuitry for protection of batteries features various pulse charging methods to prevent overheating and/or one heat sensing device for the whole multicell battery with one shut off of the whole battery from charging, or features various single fuses or circuit breakers, which protect the whole multicelled battery from overload.

Other prior art circuitry also features voltage sensing of individual cells with the termination of the charge of the whole battery, if one cell of the battery reaches the highest permitted voltage, and the termination of the discharge of the whole battery if one cell of the battery reaches the lowest permitted voltage, such as described by Exar Corp. of San Jose, Calif. These circuits may be safe, but they do not utilize full energy density of the battery or battery pack assembly, because often the other cells are not fully charged or discharged. Prior art circuitries also do not combine heat protection with voltage protection. The described circuits are usually part of the charger or part of the battery assembly, which makes the battery expensive.

Some battery chemistries are more tolerant than others to overcharge or overdischarge from a safety view point, but all batteries suffer damage in cycle life, if they are overcharged or overdischarged.

The smart interface circuit board of the invention for safe and efficient multicell battery, or pack of batteries charging or discharging, and which is preferably part of the product to be powered by said multicelled battery or pack of batteries, does not suffer from the prior art problems and provides many positive advantages.

SUMMARY OF THE INVENTION

It has now been found that any multicelled battery or battery pack or pack of batteries can be protected from overcharge, overdischarge and overheating, while its full energy density is efficiently utilized, by a smart circuit interface, and that the safe and efficient wiring and/or circuitry of any multicelled battery or battery pack or pack of batteries is provided as follows:

All the cells, or packs of cells or individual batteries, and preferably parallel packs of cells, are wired individually (two wires per cell, or pack, (+)(−) leads), to the circuit board of the invention, preferably through a flat ribbon cable with a multipin plug disconnect. The plug disconnect is preferably part of the battery and the board is preferably part of the product or device to be powered by said battery, to eliminate the need for supplying the board with every battery or battery pack sold.

Multiple charger low voltage direct current outputs, matching the quantity and voltage of the cells, or packs of cells, or batteries, are connected to the board, not to the battery or pack of batteries.

Two high voltage direct current leads (outputs) (+) (−) from the board are connected to the device or product to be powered by said battery, or pack of batteries.

At least one cell (or preferably parallel pack of cells) has also two additional wire leads from a built-in temperature sensor connected to the board preferably also through said multiple plug disconnect.

The board of the invention is described and provides sensing and switching functions as follows:

All the cells are wired and low voltage charged individually in parallel and each cell has assigned a voltage sensor on the board and an independent disconnect switch, or switches, to protect individual cells or packs of cells from overcharge.

Due to the inevitable variations in capacity of each cell, each cell may reach full charge at a different time, individually and is individually disconnected from the charge. This makes possible a very efficient charge of every cell.

All the cells are discharged in series for high voltage delivery to the device powered by said multicelled battery, and each cell has a voltage sensor assigned on the board, which may be the same sensor as described above, and an independent disconnect switch or switches to protect the individual cells from overdischarge.

Again, due to variation in the cell's capacity each cell may reach the safe discharge voltage a different time individually and is individually disconnected from the discharge process.

The described disconnect switch (or switches) of any cell also by-passes the disconnected cell, so the remaining cells (or pack of cells) can continue to operate and remain connected and continue to discharge. This makes possible a very efficient discharge of every cell.

At least one cell or individual battery also may have a temperature sensor attached which measures cell temperature and controlls indirectly an individual disconnect switch or switches, which may be the same disconnect switches as described above for voltage protection.

Each cell, or each pack of cells, or each individual battery has a designated independent control unit on the board to command the charge and discharge disconnect switches of the individual corresponding cells (or individual corresponding packs of cells, or individual corresponding batteries) based on the measured voltage by voltage sensors of each corresponding cell and selected volt limits, and also based on measured temperature by temperature sensors, preferably of each corresponding cell, and selected temperature limits.

All control units can be also integrated into one master control unit or a chip, which independently commands individual cells disconnect devices.

If a particular cell or battery does not have a sloped discharge - charge curves (voltage span), then the voltage sensors are replaced by other sensors, which can determine the state of charge or discharge.

If any cell, or any pack of cells, or any individual battery cools off to a selected normal operating temperature—then the corresponding control unit connects the disconnected cell, pack, or battery, back into the circuit through appropriate described switches, acting thus as a heat fuse.

Each cell control unit also has an electronic design feature to prevent "on-off" pulsing of the disconnected switches. "One shot" disconnect or connect is provided, based on the first reaching of the voltage limits, or state of full charge, or full discharge until the mode of operation is reversed.

The same principles apply also to each pack of cells, or each individual battery in a pack of batteries. The described circuit board and wiring may be designed for any number of cells or packs of cells, or individual batteries, of any kind of battery electrochemistry and for any electrical load, and the board with wiring can be manufactured by well known economical methods or techniques.

The principle object of the invention is to provide an interface circuit board for safe and efficient charging and discharging of multicelled batteries, or packs of batteries.

It is a further object of the invention to provide an interface circuit board for protection of individual cells, or packs of cells, or individual batteries from overcharge, overdischarge and overheating.

It is a further object of the invention to provide an interface circuit board for the protection of multicelled batteries, or packs of batteries, which is easy and economical to manufacture.

It is a further object of the invention to provide a battery interface circuit board for microcircuit devices, portable computers, electric vehicles and energy storage back up stations.

Other objects and advantageous features of the invention will become apparent from the accompanying description and drawings.

BRIEF DESCRIPTION OF THE DRAWINGS

The nature and characteristic features of the invention will be more readily understood from the following description taken in connection with the accompanying drawing forming part hereof in which.

It should of course be understood that the description and the drawings herein are merely illustrative examples, and it will be apparent that various modifications, combinations and changes can be made of the structures disclosed without departing from the spirit of the invention and from the scope of the appended claims.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same results.

Figure 1:
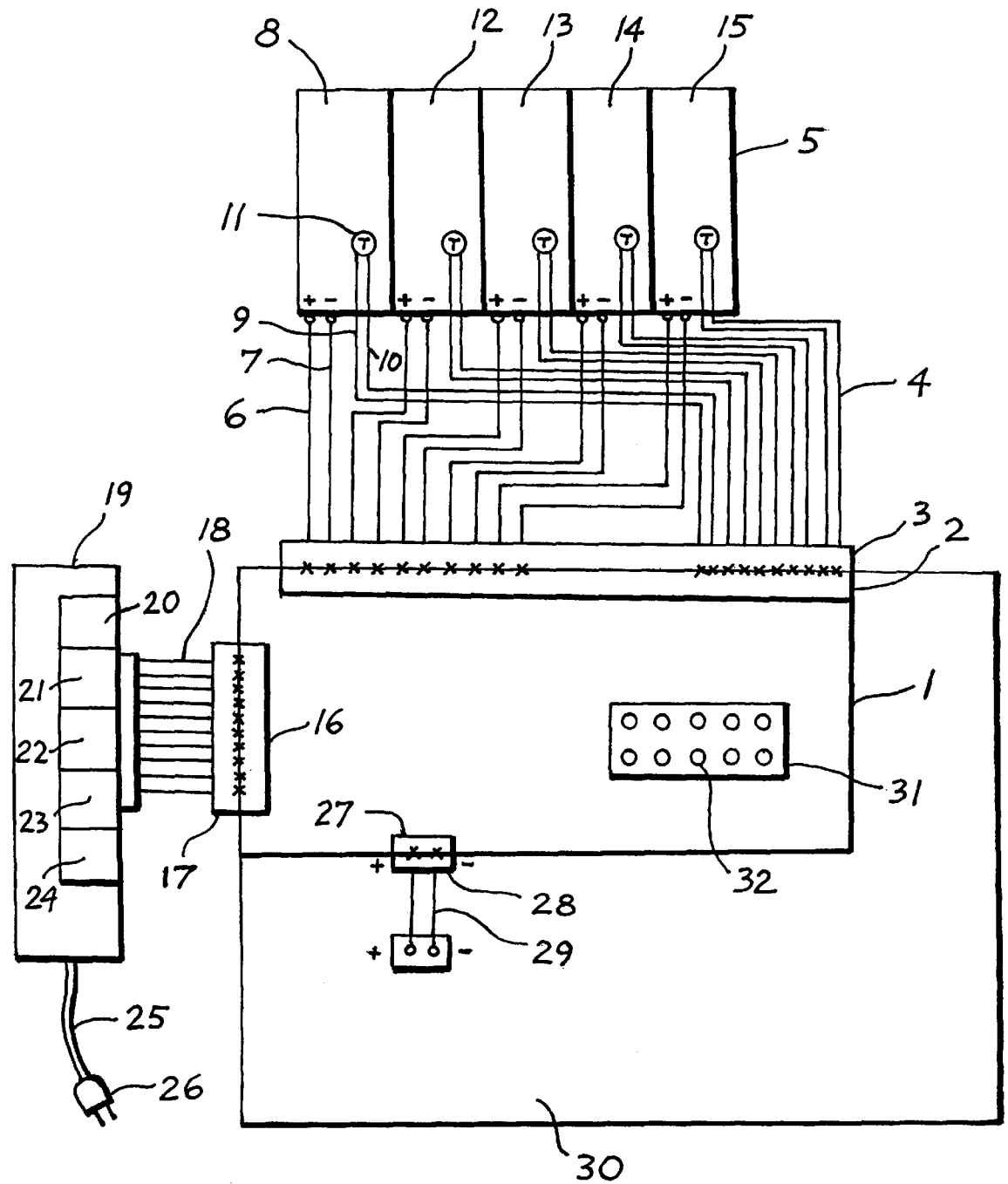
FIG. 1 is a harness diagram and components layout showing the location of various components in relation to a five cell battery interface board and their preferred cable/wire connections, according to the subject invention.

Referring now in a more detail particularly to the drawings of this patent and FIG. 1 thereof one embodiment of the invention is a five-cell battery interface circuit board with preferred connections arrangement to other components and which comprises, the interface circuit board 1 with a multipin disconnect plug 2 connected to a multipin disconnect socket 3 with a preferably flat ribbon low voltage cable 4, which has twenty wires and is connected to a five-cell battery 5 as shown. Two wires 6 and 7 connect to electrodes (+) and (−) of a cell 8 and two wires 9 and 10 to the cell's 8 temperature sensor 11. The remaining cells 12,13,14 and 15 are connected similarly with four wires of the cable 4 per cell, as shown.

The interface board 1 has also another multipin disconnect plug 16 connected to a multipin disconnect socket 17 with a ten wire preferably flat ribbon cable 18, connected to a low voltage multiple charger 19. The charger 19 contains low voltage charging modules 20 to 24 inclusive, or a direct current distribution bus (not shown), and also contains other well known electronic devices (not shown). A high voltage alternating current power cable 25 with a plug 26 is also part of the charger 19.

The board 1 has also a two pin disconnect socket 27 with a plug 28 connected to a high voltage direct current output cable 29, which is connected to a device or product 30, to be powered by the battery 5.

The board 1 may also have an optional display panel 31 with ten light emitting diodes 32. One diode per cell lights when the cell is being charged, and one diode per cell lights when the cell is being discharged. The panel 31 may be also in a remote location, off the board if desired, and may be connected to the board with a cable (not shown), or said diodes may be mounted directly on the board 1.

The board 1 may also have an optional "access plug" (not shown) to connect the board via cable with a computer and a screen monitor, to display the volts or state of charge, or energy level of each cell and/or the whole battery through various programs.

As it is shown in FIG. 1, all the cells 8,12,13,14 and 15 (or packs of cells and preferably parallel packs of cells) are wired individually (two wires per cell or pack, (+) (−) leads) to the circuit board I of the invention, as well as each cell's temperature sensor is wired individually (two wires per sensor) to the board.

The socket disconnect 3 with the cable 4 are preferably part of the battery 5, and the board 1 is preferably part of the product or device 30 to be powered by the battery 5, to eliminate the need for supplying one board 1 with every battery 5 sold for replacement.

It should be noted that the multiple charger's low voltage direct current modules 20 to 24 inclusive, are matching the quantity and voltage of the cells 8 and 12 to 15 inclusive, and that the modules are connected to the board 1 (not to the battery 5). The described multiple charger low voltage direct current modules, or at least a direct current distribution buss, may be optionally part of the board 1, or it may be a part of the charger 19, as shown. If the low voltage charging modules are part of the board, then the charger 19 should be connected to the board 1 by a two wire cable only, and the cable 18 may be replaced by an internal circuitry of the board 1.

Figure 2:
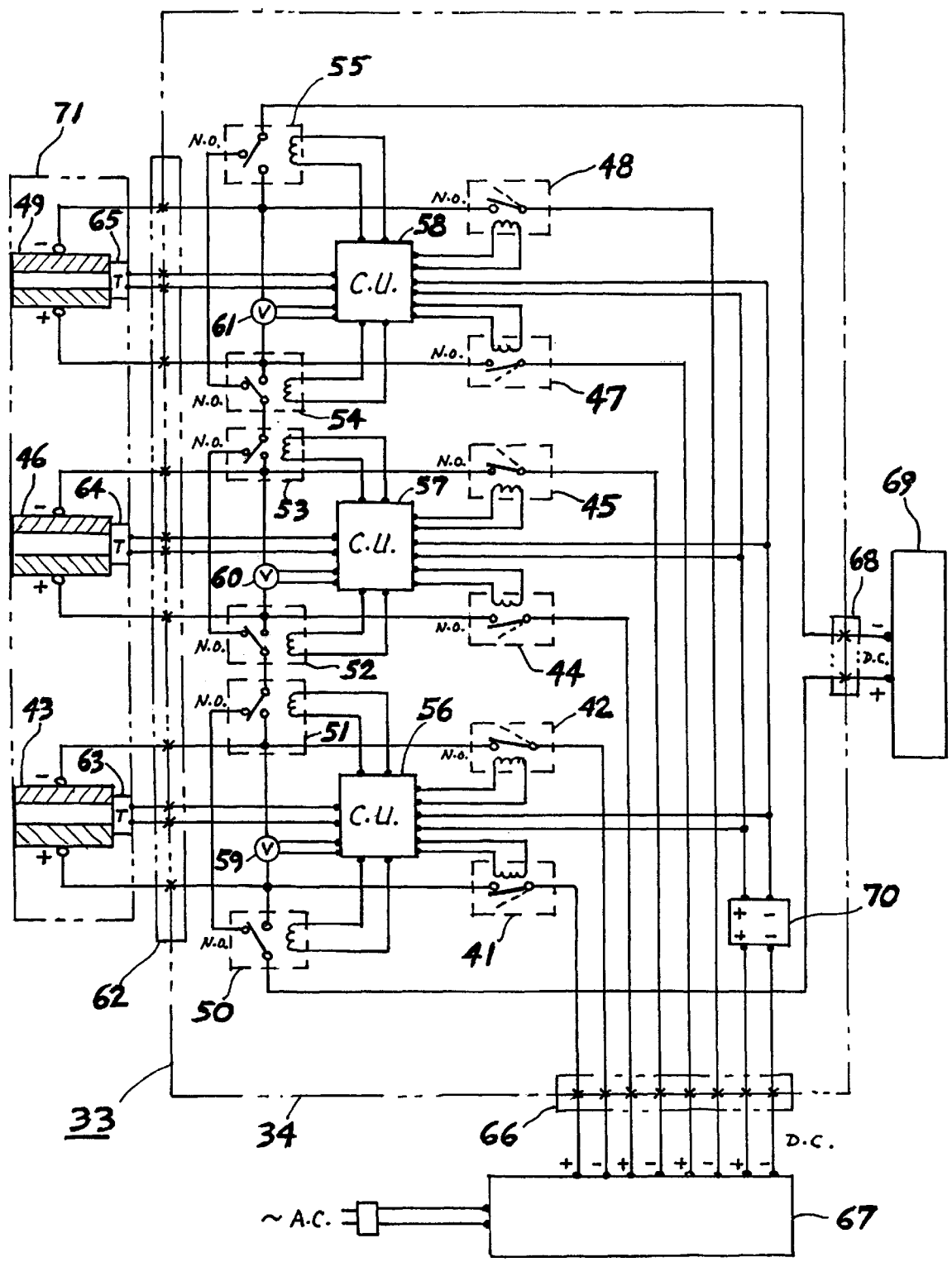
FIG. 2 is a simplified circuit schematic of a three cell battery interface circuit board, showing various components like control units, disconnect switches/relays, cells, plugs, charger and a load and their logic circuitry connections, according to the subject invention.

Referring now to FIG. 2, which shows a simplified circuit schematics of a three cell interface board assembly 33, and which is another embodiment of the invention. The board assembly 33 comprises, a support board 34 with charge disconnect switches or relays 41 and 42, which are designated for the cell 43; charge disconnect switches or relays 44 and 45, which are designated for the cell 46; charge disconnect switches or relays 47 and 48, which are designated for the cell 49; discharge disconnect switches or relays 50 and 51, which are designated for the cell 43; discharge disconnect switches or relays 52 and 53; which are designated for the cell 46; discharge disconnect switches or relays 54 and 55, which are designated for the cell 49; a control unit 56, which is designated for the cell 43; a control unit 57, which is designated for the cell 46; a control unit 58, which is designated for the cell 49; a voltage sensor 59, which is designated for the cell 43; a voltage sensor 60, which is designated for the cell 46; a voltage sensor 61, which is designated for the cell 49; a multi-pin plug disconnect 62, which is connecting cells 43, 46 and 49 and an optional temperature sensor 63 of the cell 43 and an optional temperature sensor 64 of the cell 46 and an optional temperature sensor 65 of the cell 49 with the board assembly 33; a multi-pin plug disconnect 6, which is connecting a multiple low voltage charger 67 with the board assembly 33; a two pin high voltage plug disconnect 68, which is connecting the board assembly 33 with a device or an electrical load 69; and a battery 70 to power the control units 56, 57 and 58. The cells 43, 46 and 49 are part of a multicelled battery 71. Each of the cells 43, 46 and 49 may be also replaced by a pack of cells and preferably by a parallel pack of cells (not shown), or by a multicelled battery with its cells connected in series (not shown), and which is another embodiment of the invention.

The board assembly 33 provides sensing and switching as follows: The cells 43, 46 and 49 are low voltage charged individually in parallel by the charger 67 through the board assembly 33. As is described above, each cell has designated on the board assembly 33 one voltage sensor and corresponding independent charge disconnect relays—to protect individual cells from overcharge. Due to inevitable variation in the capacity of each cell, each cell may reach a full charge in different time, individually, and is individually disconnected from the charge. This arrangement makes possible a very efficient charge of every cell in the battery 71.

The cells 43, 46 and 49 are discharged in series, through the board assembly 33, for high voltage delivery to the device 69. Each cell has designated and described voltage sensor and described corresponding independent discharge disconnect relays to protect the individual cell from overdischarge. Again, due to the variation in the cells capacities, each cell may reach the safe discharge volts at a different time individually and is thus individually disconnected from the discharge. The described discharge disconnect relays 50 to 57 inclusive, also individually bypass the disconnected cell, as shown in FIG. 2, so the remaining cells can continue to operate and are connected and discharged in the series. This arrangement makes possible a very efficient discharge of every cell in the battery 71.

Each cell, or at least one cell may have also an optional temperature sensor as described above, and each senor controls indirectly corresponding individual cell disconnect relays, which may be the same relays as described for overdischarge and/or overcharge protection.

The disconnect relays may be also various switches or multiple relays, or solid state relays, or diodes, or transistors, or any other electronic or electrical disconnect and/or bypass devices, or groups of devices.

Each cell also has designated on the board assembly 33 the described independent control unit, which may be a chip or programmable integrated circuit unit, to command the corresponding and described charge and discharge disconnect relays of the individual cell, based on measured (sensed) voltage and selected volt limits, and optionally also on measured (sensed) temperature and selected temperature limits of each cell.

All the control units can be also integrated into one master control unit or a chip, which commands individually and similarly the cells disconnect devices based on corresponding individual sensing.

If a particular cell or battery does not have a sloped discharge curve, or a voltage span then the voltage sensors 59, 60 and 61 may be replaced by other sensors, which can determine the state of the charge, and/or discharge.

If any cell cools off to a normal operating temperature within the preset limits, then the designated control unit of the cell connects the disconnected cell back into the circuit through appropriate corresponding designated and described relays, acting thus as a heat fuse.

The power for the control units 56, 57 and 58 may be supplied by a small, preferably rechargeable, independent battery 70 with a low power warning device, or the power may be supplied by other means.

The described multiple charger 67 low voltage modules, or at least a direct current distribution buss (not shown) may be part of the described board assembly 33, or it may be part of the outside charger 67.

Each cell may also have on the board assembly 33, or on an outside panel, two optional light indicators (not shown), which may be powered from the corresponding control units, and which are showing mode of operation of each cell.

One indicator lights when the cell is being charged and the other indicator lights when the cell is being discharged. The "weak" cell (with less capacity) will shut-off lights sooner than the other cells, and thus can be easily identified.

Also, an optional electronic interlock (not shown) may be provided in the board assembly 33 to prevent discharge of the battery while it is being discharged.

The design of the control units 56, 57 and 58 also provides a feature to prevent "on-off" pulsing of the disconnected switches or relays, caused by voltage sensing, or state of charge sensing only. Any cell could recover to higher volts after discharge disconnect and trigger "connect" again, then discharge quickly under the load and again trigger disconnect repeatedly. Similarly, after charge, the volts may drop after charge disconnect and trigger "connect" again, then reach full charge quickly under the charge and trigger the charge disconnect repeatedly. The "one-shot" disconnect is provided, based on the first reach of the preset limits of the volts, or full charge or discharge, until the mode of operation is reversed, from discharge to charge by plugging-in charger 67 for example, or vice versa, by discharging the battery 71 by a load 69 after charge.

The described circuit board and wiring may be designed for any amount of cells or packs of cells or individual batteries, of any kind of battery electrochemistry and for any electrical load, and the board can be manufactured by well known and economical methods or techniques.

The described circuitry can be also utilized for safe and/or efficient parallel charging only, when described individual cells or batteries discharge disconnect and/or bypass features are omitted. Similarly, if desired, the described circuitry can be utilized for safe and/or efficient discharging only, when described individual cells or batteries charge disconnect features are omitted.

The whole board or circuitry of the invention as described with all components may be made also redundant or multiple redundant to further increase safety.

Ultimately, all the electronic components of the board may be repackaged into only flat, possibly multilayered circuit print and preferably on a flexible sheet.

The board or its control logic and/or sensing as described can be also made into a photonics system such as fiber optics.

It is apparent, that a person skilled in the art of electronics and/or photonics can design the control units, the circuitry and/or the board from the provided description.

It is also apparent, that the described principal functions and features of the smart circuit interface board of the invention may be achieved by various circuit arrangements, and that changes and combinations of the disclosed structures and features can be made without departing from the basic concepts and the spirit of the invention.

Now it can be seen from the disclosed description, that the smart interface circuit board, or circuitry, for protection of any multicelled battery, or pack of batteries has been provided, with which the objects of the invention have been achieved.

I claim:

1. Interface circuitry between a multicelled battery and an electrical load and between said battery and a charger, for charging and discharging of multicelled batteries in which, all the cells are electrically connected individually to said charger and said cells are charged in parallel and are individually disconnected from charging when charged to predetermined limits, and in which all the cells are electrically connected and discharged together in series, and are individually disconnected from discharging and bypassed when discharged to predetermined limits.

2. Interface circuitry between a multi battery pack and an electrical load and between said battery pack and a charger, for charging and discharging of multi battery packs in which, all the individual batteries of said pack are electrically connected individually to said charger and said batteries are charged in parallel and are individually disconnected from charging when charged to predetermined limits, and in which all the batteries are electrically connected and discharged together in series and are individually disconnected from discharging and bypassed when discharged to predetermined limits.

3. Interface circuitry between a multicelled battery and an electrical load and between said battery and a charger, for charging and discharging of multicelled batteries in which, all the cells are electrically connected individually to said charger and said cells are charged in parallel and are individually disconnected from charging when charged to predetermined limits, and in which all the cells are electrically connected and discharged together in series, and are individually disconnected from discharging and bypassed when discharged to predetermined limits, and in which at least one cell has temperature sensing and all said cells are disconnected individually from charging, or discharging and bypassed, upon reaching predetermined temperature limits.

4. Interface circuitry between a multibattery pack and an electrical load and between said battery pack and a charger, for charging and discharging of multibattery packs in which, all the individual batteries of said pack are electrically connected individually to said charger and said batteries are charged in parallel and are individually disconnected from charging when charged to predetermined limits, and in which all the batteries are electrically connected and discharged together in series and are individually disconnected from discharging and bypassed when discharged to predetermined limits, and in which at least one battery has temperature sensing and all said batteries are disconnected individually from charging, or discharging and bypassed, upon reaching predetermined temperature limits.

5. Interface circuitry between a multicelled battery and electrical load and between said multicelled battery and a charger, for charging and discharging of multicelled batteries and protection of said battery and its individual cells from overcharge, overdischarge, overheating during charge and overheating during discharge, and which circuitry comprises, at least one cell control unit per cell of said battery and said unit having preset voltage and temperature limits, at least one cell charge disconnect device per cell of said battery, at least one cell discharge disconnect and bypass device per cell of said battery, at least one cell voltage sensor per cell of said battery, at least one cell temperature sensor per said battery, means of individually electrically connecting individual cells to said disconnect and bypass devices, means of individually electrically connecting said charge disconnect devices to said charger, means of electrically connecting said cells through said discharge disconnect and bypass devices in series to said electrical load, means of electrically connecting said individual cell voltage sensors to said corresponding individual cell control units, means of electrically connecting said individual cell temperature sensors to said corresponding individual cell control units, means of individually connecting said charge disconnect and discharge disconnect and bypass devices to said corresponding individual cell control units, and means of electric power supply to said cell control units, and in which said control units command said corresponding cell disconnect and bypass devices and said control limits commands are based on inputs from said corresponding voltage and temperature sensors and said preset limits.

6. Interface circuitry between a multibattery pack and electrical load and between said multibattery pack and a charger, for charging and discharging of multibattery packs and protection of said pack and its individual batteries from overcharge, overdischarge, overheating during charge and overheating during discharge, and which circuitry comprises, at least one battery control unit per battery of said multibattery pack and said unit having preset voltage and temperature limits, at least one battery discharge disconnect and bypass device per battery of said multibattery pack, at least one battery voltage sensor per battery of said multibattery pack, at least one battery charge disconnect device per battery of said multibattery pack, at least one battery temperature sensor per battery of said multibattery pack, means of individually electrically connecting individual batteries to said disconnect and bypass devices, means of individually electrically connecting said charge disconnect devices to said charger, means of electrically connecting said batteries of said battery pack through said discharge disconnect and bypass devices in series to said electrical load, means of individually electrically connecting said individual battery voltage sensors to said corresponding individual battery control units, means of individually electrically connecting said individual battery temperature sensors to corresponding individual battery control units, means of individually electrically connecting said charge disconnect and discharge disconnect and bypass devices to said corresponding individual battery control units, and means of electric power supply to said battery control units, and in which said individual battery control units command said corresponding battery disconnect devices, and said commands are based on inputs from said corresponding voltage and temperature sensors and said preset limits.

7. Interface circuitry between a multicelled battery and electrical load and between said multicelled battery and a charger, for charging and discharging of multicelled batteries and protection of said battery and its individual cells from overcharge, and overdischarge, and which circuitry comprises, at least one cell control unit per cell of said battery and said unit having preset voltage limits, at least one cell charge disconnect device per cell of said battery, at least one cell discharge disconnect and bypass device per cell of said battery, at least one cell voltage sensor per cell of said battery, means of individually electrically connecting individual cells to said disconnect and bypass devices, means of individually electrically connecting said charge disconnect devices to a charger, means of electrically connecting said cells through said discharge disconnect and bypass devices in series to said electrical load, means of electrically connecting said individual cell voltage sensors to said corresponding individual cell control units, means of individually connecting said charge disconnect and discharge disconnect and bypass devices to said corresponding individual cell control units, and means of electric power supply to said cell control units, and in which said control units command said corresponding cell disconnect and bypass devices and said control units commands are based on inputs from said corresponding voltage sensors and said preset limits.

8. Interface circuitry between a multibattery pack and electrical load and between said multibattery pack and a charger, for charging and discharging of multibattery packs and protection of said pack and its individual batteries from overcharge, and overdischarge and which circuitry comprises, at least one battery control unit per battery of said multibattery pack and said unit having preset voltage limits, at least one battery charge disconnect device per battery of said multibattery pack, at least one battery discharge disconnect and bypass device per battery of said multibattery pack, at least one battery voltage sensor per battery of said multibattery pack of said multibattery pack, means of individually electrically connecting individual batteries to said disconnect and bypass devices, means of individually electrically connecting said charge disconnect devices to a charger, means of electrically connecting said batteries of said battery pack through said discharge disconnect and bypass devices in series to said electrical load, means of individually electrically connecting said individual battery voltage sensors to said corresponding individual battery control units, means of individually electrically connecting said charge disconnect and discharge disconnect and bypass devices to said corresponding individual battery control units, and means of electric power supply to said battery control units, and in which said individual battery control units command said corresponding battery disconnect devices, and said control units commands are based on inputs from said corresponding voltage sensors and said preset limits.

9. Interface circuitry between a multicelled battery and a charger, for charging of multicelled batteries in which, all the cells are electrically connected individually to said charger and said cells are charged in parallel and are individually disconnected from charging when charged to predetermined limits.

10. Interface circuitry between a multibattery pack and a charger, for charging of multibattery packs in which, all the individual batteries of said pack are electrically connected individually to said charger and said batteries are charged in parallel and are individually disconnected from charging when charged to predetermined limits.

11. Interface circuitry between a multicelled battery and a charger, for charging of multicelled batteries in which, all the cells are electrically connected individually to said charger and said cells are charged in parallel and are individually disconnected from charging when charged to predetermined limits, and in which at least one cell has temperature sensing and all said cells are disconnected individually from charging, upon reaching predetermined temperature limits.

12. Interface circuitry between a multibattery pack and a charger, for charging of multibattery packs in which, all the individual batteries of said pack are electrically connected individually to said charger and said batteries are charged in parallel and are individually disconnected from charging when charged to predetermined limits, and in which at least one battery has temperature sensing and all said batteries are disconnected individually from charging, upon reaching predetermined temperature limits.

13. Interface circuitry between a multicelled battery and electrical load and between said multicelled battery and a charger, for charging of multicelled batteries and protection of said battery and its individual cells from overcharge and overheating during charge, and which circuitry comprises, at least one cell control unit per cell of said battery and said unit having preset voltage and temperature limits, at least one cell charge disconnect device per cell of said battery, at least one cell voltage sensor per cell of said battery, at least one cell temperature sensor per said battery, means of individually electrically connecting individual cells to said disconnect devices, means of individually electrically connecting said charge disconnect devices to said charger, means of electrically connecting said individual cell voltage sensors to said corresponding individual cell control units, means of electrically connecting said individual cell temperature sensors to said corresponding individual cell control units, means of individually connecting said charge disconnect devices to said corresponding individual cell control units, and means of electric power supply to said cell control units, and in which said control units command said corresponding cells disconnect devices and said commands are based on inputs from said corresponding voltage and temperature sensors and said preset limits.

14. Interface circuitry between a multibattery pack and electrical load and between said multibattery pack and a charger, for charging and discharging of multibattery packs and protection of said pack and its individual batteries from overcharge and overheating during charge, and which circuitry comprises, at least one battery control unit per battery of said multibattery pack and said unit having preset voltage and temperature limits, at least one battery voltage sensor per battery of said multibattery pack, at least one battery charge disconnect device per battery of said multibattery pack, at least one battery temperature sensor per battery of said multibattery pack, means of individually electrically connecting individual batteries to said disconnect devices, means of individually electrically connecting said charge disconnect devices to a charger, means of individually electrically connecting said individual battery voltage sensors to said corresponding individual battery control units, means of individually electrically connecting said individual battery temperature sensors to corresponding individual battery control units, means of individually electrically connecting said charge disconnect devices to said corresponding individual battery control units, and means of electric power supply to said battery control units, and in which said individual battery control units command said corresponding battery disconnect devices, and said commands are based on inputs from said corresponding voltage and temperature sensors and said preset limits.

15. Interface circuitry between a multicelled battery and electrical load and between said multicelled battery and a charger, for charging and discharging of multicelled batteries and protection of said battery and its individual cells from overcharge, and which circuitry comprises, at least one cell control unit per cell of said battery and said unit having preset voltage limits, at least one cell charge disconnect device per cell of said battery, at least one cell voltage sensor per cell of said battery, means of individually electrically connecting individual cells to said disconnect devices, means of individually electrically connecting said charge disconnect devices to a charger, means of electrically connecting said individual cell voltage sensors to said corresponding individual cell control units, means of individually connecting said charge disconnect devices to said corresponding individual cell control units, and means of electric power supply to said cell control units, and in which said control units command said corresponding cell disconnect and bypass devices and said commands are based on inputs from said corresponding voltage sensors and said preset limits.

16. Interface circuitry between a multibattery pack and electrical load and between said multibattery pack and a charger, for charging of multibattery packs and protection of said pack and its individual batteries from overcharge, and which circuitry comprises, at least one battery control unit per battery of said multibattery pack and said unit having preset voltage limits, at least one battery charge disconnect device per battery of said multibattery pack, at least one battery voltage sensor per battery of said multibattery pack, at least one battery voltage sensor per battery of said multibattery pack, means of individually electrically connecting individual batteries to said disconnect devices, means of individually electrically connecting said charge disconnect devices to a charger, means of individually electrically connecting said individual battery voltage sensors to said corresponding individual battery control units, means of individually electrically connecting said charge disconnect devices to said corresponding individual battery control units, and means of electric power supply to said battery control units, and in which said individual battery control units command said corresponding battery disconnect devices, and said commands are based on inputs from said corresponding voltage sensors and said preset limits.

17. Interface circuitry between a multicelled battery and an electrical load for discharging of multicelled batteries in which, all the cells are electrically connected and discharged together in series, and are individually disconnected from discharging and bypassed when discharged to predetermined limits.

18. Interface circuity between a multi battery pack and an electrical load for discharging of multi battery packs in which all the batteries are electrically connected and discharged together in series and are individually disconnected from discharging and bypassed when discharged to predetermined limits.

19. Interface circuitry between a multicelled battery and an electrical load for discharging of multicelled batteries in which all the cells are electrically connected and discharged together in series, and are individually disconnected from discharging and bypassed when discharged to predetermined limits, and in which at least one cell has temperature sensing and all said cells are disconnected individually from discharging and bypassed, upon reaching predetermined temperature limits.

20. Interface circuitry between a multibattery pack and an electrical load for discharging of multibattery packs in which, all the individual batteries of said pack are electrically connected and discharged together in series and are individually disconnected from discharging and bypassed when discharged to predetermined limits, and in which at least one battery has temperature sensing and all said batteries are disconnected individually from discharging and bypassed, upon reaching predetermined temperature limits.

21. Interface circuitry as described in claims 2 or 4 or 6 or 8 or 10 or 12 or 14 or 16 or 18 or 20, in which said individual batteries of said multibattery pack have cells connected in parallel.

22. Interface circuitry as described in claims 2 or 4 or 6 or 8 or 10 or 12 or 14 or 16 or 18 or 20, in which said individual batteries of said multibattery pack have cells connected in series.

23. Interface circuitry as described in claims 5 or 6 or 13 or 14, in which said voltage sensors are replaced by state of charge sensors and said control units commands are based on state of charge, said temperature and said preset limits.

24. Interface circuitry as described in claims 7 or 8 or 15 or 16, in which said voltage sensors are replaced by state of charge or sensors and said control units commands are based on state of charge and said preset limits.

25. Interface circuitry as described in claims 1 or 3 or 5 or 7 or 9 or 11 or 13 or 15 or 17 or 19, which is assembled on a board.

26. Interface circuitry as described in claim 13, in which said board is part of a product, and said product is powered by a multicelled battery pack through said board.

27. Interface circuitry as described in claims 1 or 3 or 5 or 7 or, which additionally includes two light indicators per each cell and said indicators are showing charge and discharge modes of operation of each individual cell.

28. Interface circuitry as described in claim 1 or 2 or 3 or 4 or 5 or 6 or 7 or 8 or 9 or 10 or 11 or 12 or 13 or 14 or 15 or 16 or 17 or 18 or 19, which is made redundant.

29. Interface circuitry as described in claims 1 or 2 or 3 or 4 or 5 or 6 or 8 or 9 or 10 or 11 or 12 or 13 or 14 or 15 or 16 or 17 or 18 or 19 or 20, which has its control logic made in photonics system.

30. Interface circuitry as described in claims 5 or 6 or 7 or 8 or 13 or 14 or 15 or 16, in which said control units are integrated into one unit commanding individual cells disconnect devices based on corresponding individual sensing.

31. Interface circuitry as described in claims 2 or 4 or 6 or 8 or 10 or 12 or 14 or 16 or 18 or 20, which is assembled on a board.

32. Interface circuitry as described in claim 31, in which said board is part of a product and said product is powered by a multibattery pack through said board.

33. Interface circuitry as described in claims 2 or 4 or 6 or 8, which additionally includes two light indicators per each battery and said indicators are showing charge and discharge modes of operation of each individual battery.

34. Interface circuitry as described in claims 1 or 2 or 3 or 4 or 5 or 6 or 7 or 8 or 9 or 10 or 11 or 12 or 13 or 14 or 15 or 16 or 17 or 18 or 19 or 20, which has its sensing mode made in photonic system.

* * * * *